United States Patent [19]

Uenaka et al.

[11] Patent Number: 4,797,698

[45] Date of Patent: Jan. 10, 1989

[54] FILM FEEDING APPARATUS

[75] Inventors: Kazushige Uenaka, Tokyo; Haruo Takase, Kanagawa; Riuzi Utomo; Masuo Akimoto, both of Tokyo, all of Japan

[73] Assignee: Fuji Photo Film Co., Ltd., Kanagawa, Japan

[21] Appl. No.: 129,207

[22] Filed: Dec. 7, 1987

Related U.S. Application Data

[62] Division of Ser. No. 813,320, Dec. 24, 1985, Pat. No. 4,731,628.

[30] Foreign Application Priority Data

Dec. 26, 1984 [JP] Japan ................................ 59-278989
Dec. 26, 1984 [JP] Japan ................................ 59-278990
Dec. 26, 1984 [JP] Japan ................................ 59-278991

[51] Int. Cl.⁴ ........................ G03B 17/36; G03D 3/08

[52] U.S. Cl. .................................... 354/275; 354/319; 242/71.1

[58] Field of Search ............... 354/174, 275, 319, 320, 354/321, 322; 242/71, 71.1, 71.2, 71.7; 352/72, 78 R

[56] References Cited

U.S. PATENT DOCUMENTS

| | | | |
|---|---|---|---|
| 3,195,438 | 7/1965 | Woodcock | 354/310 |
| 3,692,391 | 9/1972 | Winkler et al. | 352/72 |
| 3,776,483 | 12/1973 | Reitter | 242/71.1 |
| 3,820,136 | 6/1974 | Kennedy | 354/174 |
| 3,903,535 | 9/1975 | Moodie et al. | 354/174 |
| 4,076,135 | 2/1978 | Klose | 354/310 |
| 4,218,123 | 8/1980 | Viehrig | 354/310 |
| 4,311,379 | 1/1982 | Falomo | 354/319 |
| 4,482,233 | 11/1984 | Bauer et al. | 354/312 |

*Primary Examiner*—A. A. Mathews
*Attorney, Agent, or Firm*—Sughrue, Mion, Zinn, Macpeak & Seas

[57] ABSTRACT

A film feeding apparatus for automatically feeding a negative film accommodated in a patrone to a developing machine includes: means for accommodating a multiplicity of magazines piled one upon another, each magazine accommodating a patrone; driving means for feeding the lowermost magazine among those accommodated in the accommodating means to a film receiving port of the developing machine; and means for retracting the magazine from the film receiving port so as to be discharged after the feed of the film has been completed, whereby the magazines are successively moved, and the films are thereby automatically fed to the developing machine.

7 Claims, 12 Drawing Sheets

FILM FEEDING APPARATUS

This is a division of application Ser. No. 813,320 filed Dec. 24, 1985, now U.S. Pat. No. 4,731,628.

BACKGROUND OF THE INVENTION

1. Field of the Invention

The present invention relates to a film feeding apparatus for feeding a film accommodated in a patrone (film cartridge) to a developing machine.

2. Description of the Related Art

One type of film feeding apparatus has already been proposed in which a thin-walled leader is connected to the leading end of a film projecting from a patrone, and the leader is successively moved through various developing tanks, whereby the film is drawn out from the patrone and automatically developed. This type of film feeding apparatus enables an automatic developing operation simply by manually connecting the leader to the leading end of the film drawn out from the patrone using, for example, adhesive tape, and setting this film on a developing machine.

However, in this type of developing machine, when the entire length of the film has been drawn out from the patrone and the developing operation for this film has been completed, the operator must repeat the operation in which he connects a leader to the film accommodated in the subsequent patrone and sets the film on the developing machine. For this reason, although the development can be automatically effected, it is necessary to manually set each film on the developing machine, which leads to a reduction in the working efficiency.

SUMMARY OF THE INVENTION

In view of the above circumstances, it is a primary object of the present invention to provide a film feeding apparatus which enables a continuous automatic developing operation by setting a multiplicity of films on a developing machine in advance.

To this end, the present invention provides a film feeding apparatus which includes means for accommodating a multiplicity of magazines piled one upon another, each magazine accommodating a patrone; magazine driving means for moving the lowermost magazine among those accommodated within the accommodating means to a film receiving section of a developing machine and causing the film within this magazine to be clamped by a feed roller located within the film inlet section; and discharge means for retracting the magazine from the receiving section so as to be taken out afte the film has been completely fed from the magazine to the developing machine.

By virtue of the above arrangement, it is possible for the operator to load a multiplicity of magazines into the accommodating means in advance in such a manner that the magazines are piled up one upon another, each magazine accommodating a patrone and a leader. The lowermost magazine among those loaded in the accommodating means is moved to the film receiving section of the developing machine by the driving means, and the film within this magazine is then fed to the developing machine. When the supply of the film has been completed, the magazine is discharged by the discharge means. In this way, a multiplicity of films may be automatically developed in order.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
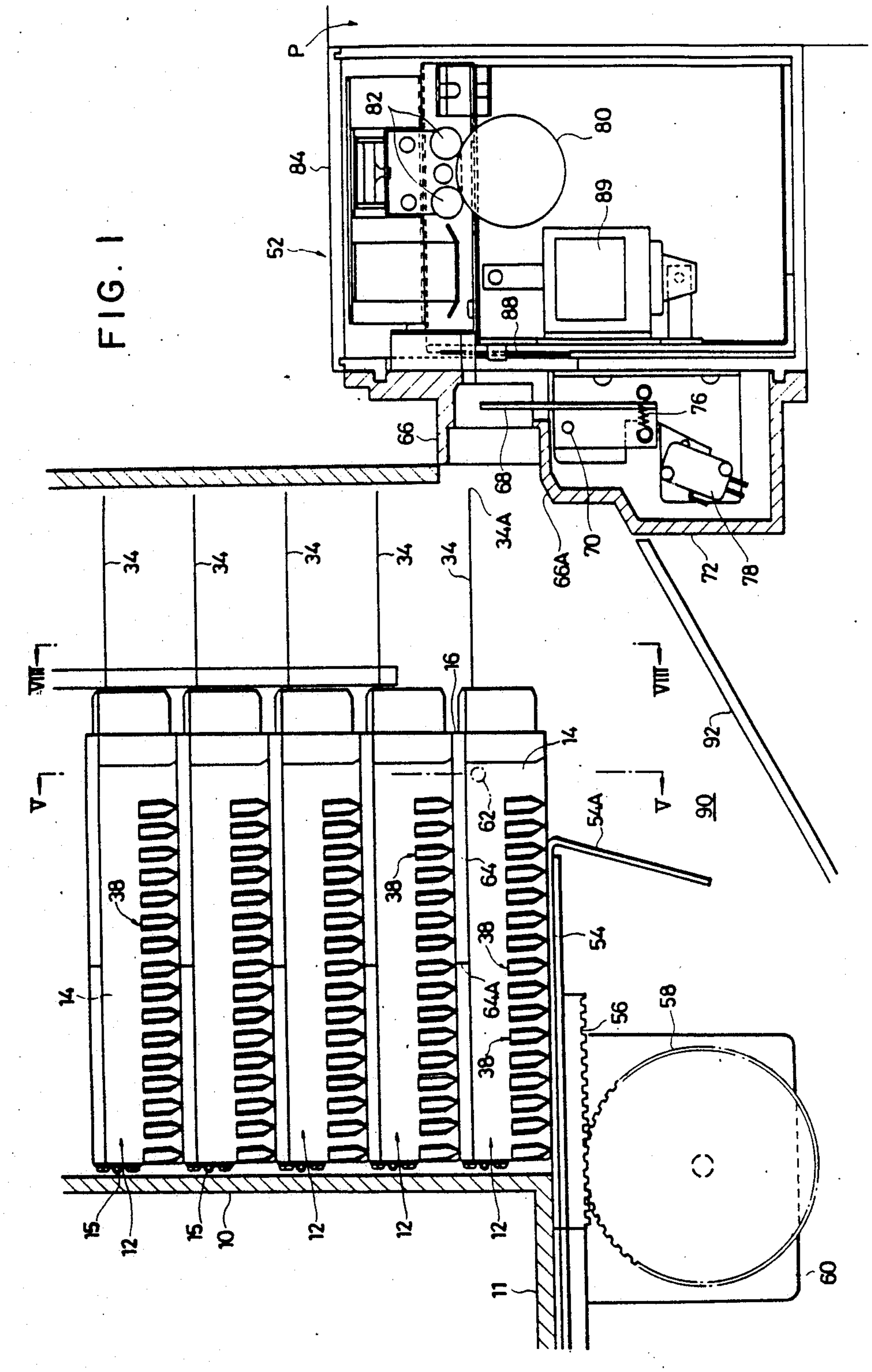
FIG. 1 is a vertical sectional view of a film feeding apparatus to which a first embodiment of the present invention is applied.
Figure 2:
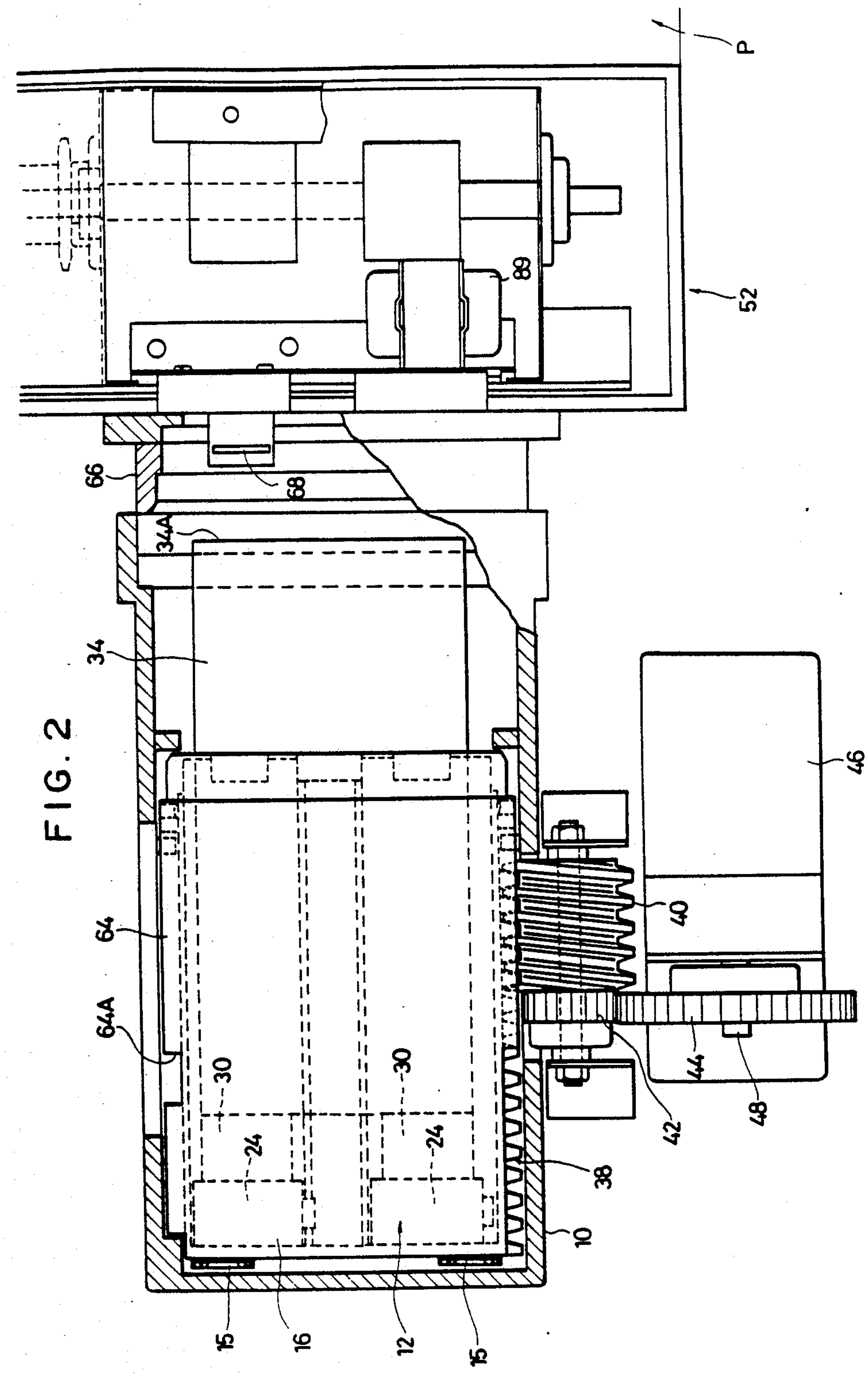
FIG. 2 is a plan view of the apparatus shown in FIG. 1.

Referring first to FIGS. 1 and 2 which show in combination a film feeding apparatus for feeding a film to a developing machine P in accordance with a first embodiment of the present invention, a frame-shaped stand 10 which serves as an accommodating means is provided on a mac.hine frame 11 so as to project upwardly, and a multiplicity of magazins 12 are loaded in the stand 10.

Figure 3:
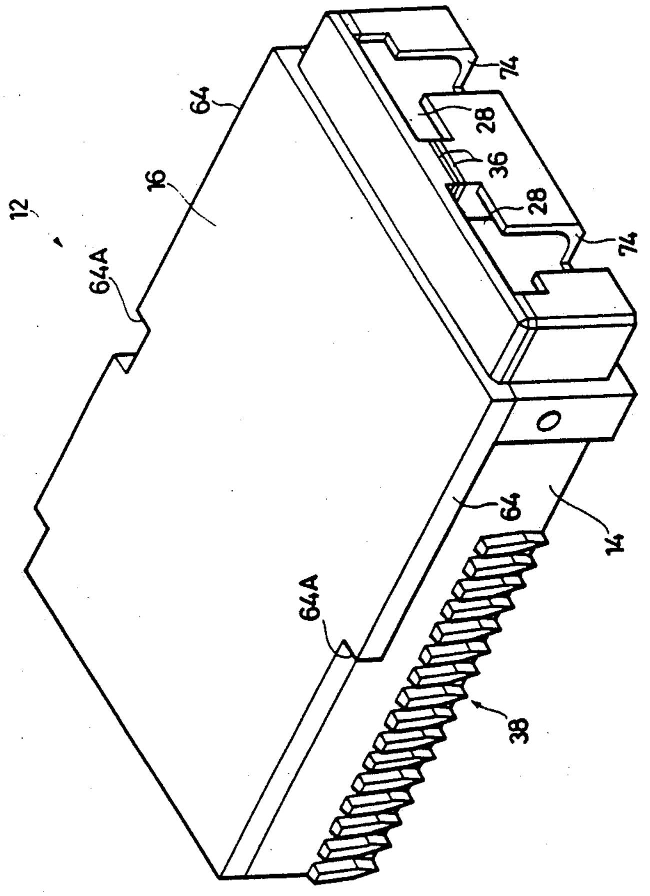
FIG. 3 is a perspective view of a magazine employed in this embodiment.
Figure 4:
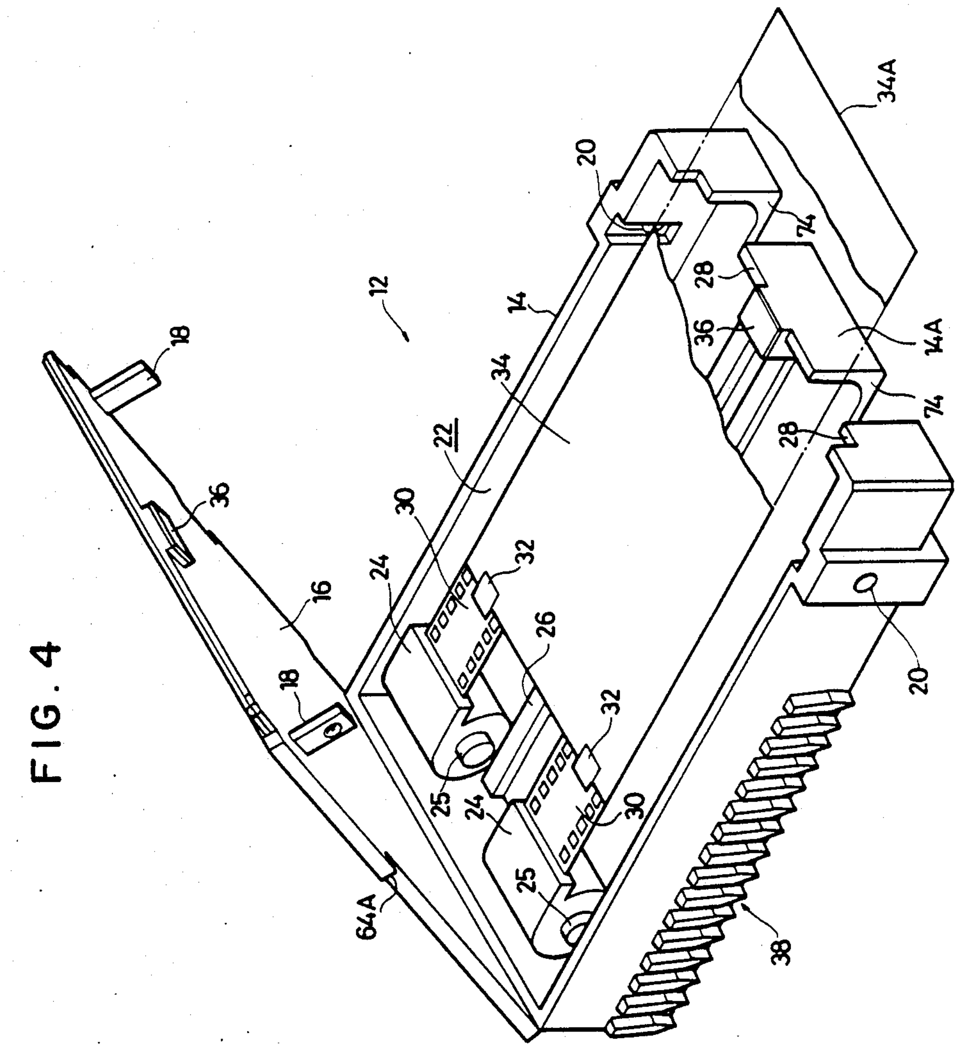
FIG. 4 is a perspective view of the magazine with its cover opened.

One of the magazines 12 is shown in FIGS. 3 and 4 in detail. A magazine body 14 is formed such as to have the shape of a box the top of which is opened. A cover 16 is pivotally supported at one end of the magazine body 14 by a hinge 15 (see FIG. 1) so that the cover 16 covers the interior of the magazine body 14, and when raised, the interior is exposed. Arms 18 respectively project from distal end portions of the cover 16. When the cover 16 is in its closed state, the arms 18 are respectively engaged with clicks 20 which are provided on the magazine body 14 so that the cover 16 is maintained in its closed position.

The interior of the magazine body 14 is defined as a patrone accommodating portion 22. In this embodiment, the patrone accommodating portion 22 can accommodate a pair of patrones 24. A rib 26 is formed on the bottom surface of the patrone accommodating portion 22 and between the patrones 24 so as to extend longitudinally of the magazine body 14, thereby limiting the movement of the pair of patrones 24 in the lateral direction of the magazine body 14 and hence preventing the patrones 24 from interfering with each other.

The patrones 24 which are accommodated at one end of the patrone accommodating portion 22 as shown in FIG. 4 are movable toward respective film delivery ports 28 which are constituted by openings formed in the other end portion of the magazine body 14 until the patrones 24 abut against the front end wall 14A.

Each patrone 24 accommodates the greater part of a negative film 30 which is wound on the portion of a reel 25 within the patrone 24. A thin-walled flexible leader 34 is connected to the respective leading end portions of the negative films 30 which are pulled out from the respective patrones 24, using pieces of adhesive tape 32. The lateral dimension of the leader 34 is so set that two negative films 30 which are placed parallel to each other can be connected to the leader 34 by the pieces of adhesive tape 32. The longitudinal dimension of the leader 34 is so set that the leading end portion 34A of the leader 34 projects from the film delivery ports 28 even in a state wherein the patrones 24 are disposed at the end of the patrone accommodating portion 22, as shown in FIG. 4.

Pieces of felt 36 which serve as clamping and guiding means are attached to the peripheral edges of the film delivery ports 28 so that the pieces of felt 36 tightly clamp the leader 34 and dispose the leading end portion 34A of the leader 34 at a predetermined position, thereby allowing the leader 34 to be reliably transported to the developing machine P.

Figure 5:
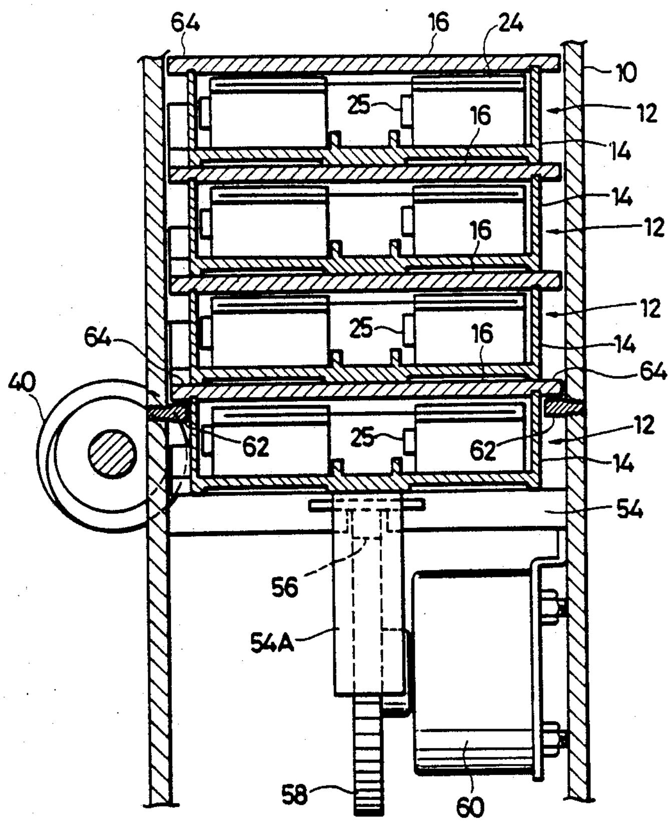
FIG. 5 is a sectional view taken along the line V—V of FIG. 1.

A plurality of parallel projections are provided on one side surface of the magazine body 14 so as to extend orthogonally to the longitudinal direction of the magazine body 14, thus constituting in combination a rack 38. The rack 38 is meshed with a worm 40 rotatably supported by the machine frame 11, as shown in FIGS. 2 and 5. A pinion 42 is coaxially secured to the worm 40 and is meshed with a gear wheel 44 which is in turn secured to the output shaft 48 of a motor 46.

Accordingly, the motor 46 when activated causes the worm 40 to turn so as to feed the magazine body 14 to a film receiving section 52 of the film developing machine P through the rack 38, thus constituting a magazine driving means. The combination of the rack 38 and the worm 40 also constitutes a part of a discharge means for drawing out the magazine 12 from the film receiving section 52 by reversing the motor 46 upon the completion of the supply of the films 30 to the section 52 from the magazine 12.

The worm 40 and the rack 38 are preferably engaged with each other so as to generate a driving force which acts in such a manner that when the magazine body 14 is moved toward the film receiving section 52 of the developing machine P, the magazine body 14 is fed with its bottom surface being pressed against a support plate 54. For this purpose, the plurality of projections, which constitute the rack 38, are disposed so as to slant with respect to the vertical plane.

The support plate 54 abuts against the bottom surface of the magazine body 14 of the lowermost one of a plurality of magazines 12 loaded within the stand 10 and constitutes a guide surface on which the magazine body 14 of the lowermost magazine 12 slides when moved toward the film receiving section 52. A rack 56 is secured to the undersurface of the support plate 54, that is, the side of the plate 54 which is opposite to the surface which abuts against the magazine body 14, the rack 56 being meshed with a spur gear 58. The spur gear 58 is rotated by the driving force from a motor 60 so that the support plate 54 can be retracted from the position illustrated in FIG. 1 to that illustrated in FIG. 7.

As shown in FIG. 5, retaining pins 62 are screwed into two opposing inner walls of the stand 10 so that the pins 62 coaxially project toward each other. The pins 62 respectively oppose lateral projections 64 formed on the cover 16 of the magazine body 14 of the lowermost magazine 12 in the stand 10. More specifically, when each magazine body 14 moves downward within the stand 10 and abuts against the support plate 54, the retaining pins 62 respectively support the lateral projections 64 and restrain the rightward end portion (as viewed in FIG. 1) of the magazine body 14 from unnecessarily coming below the support plate 54.

Figure 6:
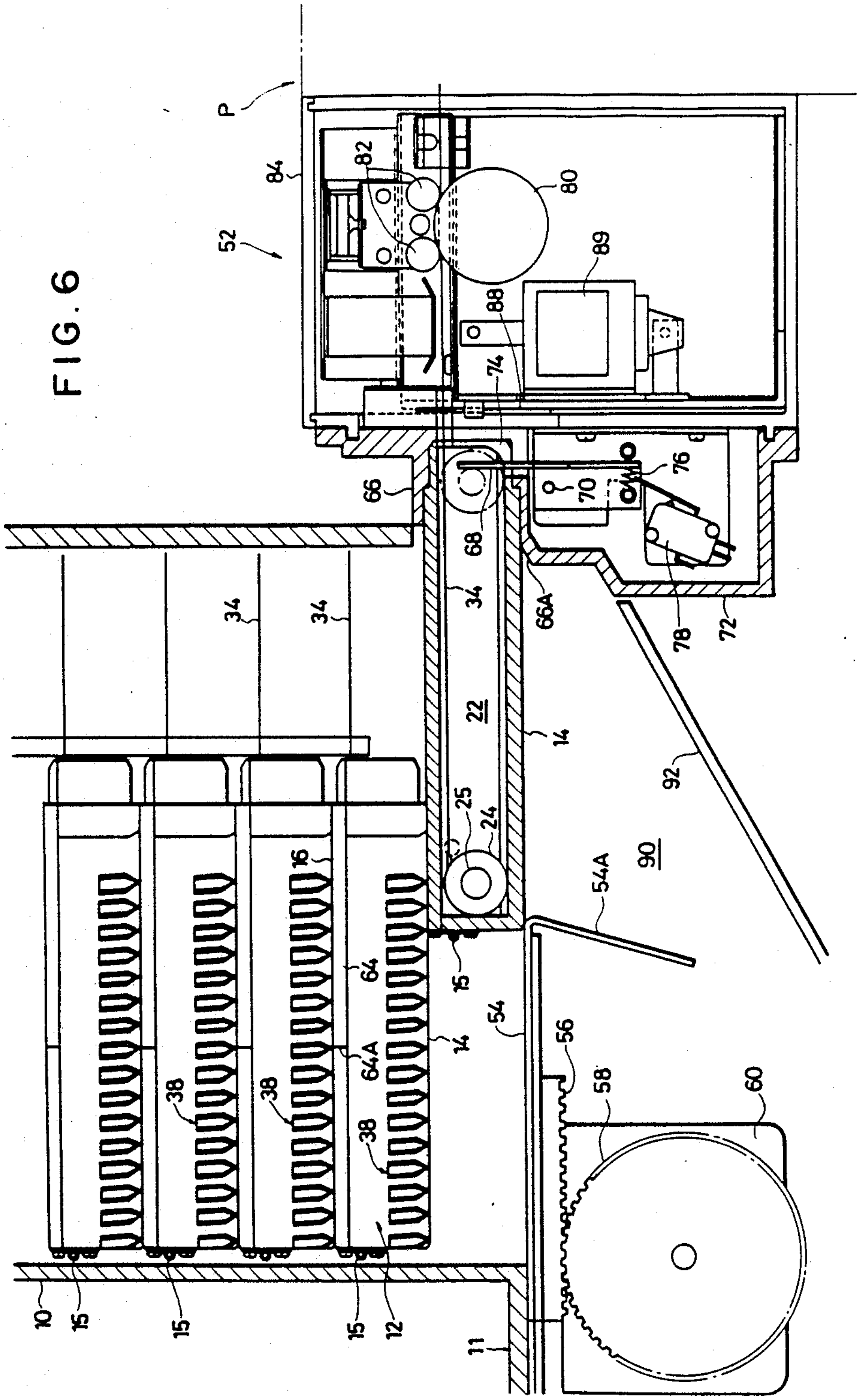
FIG. 6 shows the apparatus illustrated in FIG. 1 in a state wherein the magazine is fitted into a film receiving section.

The length of each of the pins 62 is so set that the magazine body 14 of the lowermost magazine 12 is supported by the pins 62 until the time immediately before the magazine body 14 which is moved rightwardly as viewed in FIG. 1 by the driving force from the motor 60 is fitted into a receiving portion 66 for receiving the leading end of the magazine body 14 which is formed in the film receiving section 52 as shown in FIG. 6. Thus, when the leading end portion of themmagazine body 14 reaches the supporting end 66A of the receiving portion 66, the respective ends 64A of the lateral projections 64 are disengaged from the corresponding retaining pins 62.

In the film receiving section 52, the distal end portion of a stopper 68 extends into the leading end receiving portion 66. The stopper 68 is pivotally supported by a frame 72 for the film receiving section 52 through a pin 70. The distal end portion of the stopper 68 enters openings 74 (see FIG. 4) provided at the leading end of the magazine body 14 inserted into the receiving portion 66 so that the distal end portion of the stopper 68 is disposed inside the patrone accommodating portion 22.

The stopper 68 will be described below in more detail.

As shown in FIG. 6, in a state wherein the magazine body 14 is fitted into the leading end receiving portion 66, the stopper 68 is biased by means of the force from a tension coil spring 76 interposed between the same and the frame 72 in the direction in which the stopper 68 enters the patrone accommodating portion 22. However, when the patrones 24 are moved to the position shown by the imaginary line in FIG. 6, the stopper 68 is pivoted about the pin 70 in the direction in which the stopper 68 is expelled from the patrone accommodating portion 22 against the biasing force of the tension coil spring 76.

When the stopper 68 is thus pivoted, a limit switch 78 secured to the frame 72 detects the pivoted state of the stopper 68 and delivers a detection signal to a controller (not shown). Thus, the controller can acknowledge a film end condition. A feed roller 80 is rotatably supported within the film receiving section 52, and a plurality of press rollers 82 are brought into contact with the feed roller 80 by means of biasing force. The press rollers 82 are mounted on a cover 84 for the film receiving section 52 so that the press rollers 82 are separated from the feed roller 80 when the cover 84 is opened and the shielding of light from the interior of the film receiving section 52 is canceled.

In a state wherein the magazine body 14 is connected to the film receiving section 52, the leader 34 projecting from th film delivery ports 28 of the magazine body 14 is clamped between the feed roller 80 and the press rollers 82 and is delivered toward the developing machine P by means of the rotational force from the feed roller 80.

The film receiving section 52 is provided with a cutter 88 between the feed roller 80 and the leading end receiving portion 66. The cutter 88 can be moved so as to enter and retract from the locus of movement of the leader 34 and the negative films 30. The cutter 88 is retracted from this locus when the leader 34 and the negative films 30 attached thereto are transported. However, when the limit switch 78 detects the above-described pivoted state of the stopper 68, the cutter 88 is moved so as to enter the locus of the films 30 by means of the driving force applied thereto from a solenoid 89 so as to cut the respective trailing end portions of the negative films 30, whereby the greater part of each negative film 30 which has already entered the inside of the developing machine P is cut off from the trailing end portion of the film 30 within the corresponding patrone 24.

A discharge passage 90 for discharging the magazine 12 is provided between the film receiving section 52 and the support plate 54. Thus, the magazine 12 from which the negative films 30 have already been unloaded is dropped while being guided by a bent portion 54A formed at the distal end of the support plate 54 and a chute 92.

The following is a description of the operation of this embodiment.

Patrones 24 having a leader 34 attached to the respective leading end portions of negative films 30 by pieces of adhesive tape 32 are accommodated in each of a plurality of magazines 12 with the cover 16 opened, a shown in FIG. 4, and a plurality of magazine bodies 14 are loaded into the stand 10.

In this state, light enters the interior of each magazine 12 through the film delivery ports 28. However, since the portion of each film 30 on which images have been recorded is accommodated within the patrone 24, there is no risk of this portion of the film 30 being exposed undesirably. It is therefore possible to supplementally load any desired number of magazines 12 into the stand 10 at any time according to need.

In this loaded state, the suppor plate 54 is disposed closer to the film receiving section 52, as shown in FIG. 1. Thus, the loaded magazine bodies 14 are supported by the support plate 54, and the lateral projections 64 of the lowermost magazine body 14 respectively abut against the retaining pins 62. In consequence, the magazine bodies 14 are horizontally accommodated in the stand 10 as shown in FIG. 1.

Then, the motor 46 is started so as to move the rack 38 through the worm 40, and the lowermost magazine 12 is thereby moved rightwardly as viewed in FIG. 1. During this rightward movement, the leading end portion of the magazine 12 is gradually pushed out from the support plate 54, thus causing the leading end portion of the magazine 12 to move downwardly by its own weight. However, since the respective undersurfaces of the lateral projections 64 are in contact with the retaining pins 62, the leading end portion of the magazine 12 is accurately transferred to the leading end receiving portion 66.

When the magazine 12 has been fitted into the receiving portion 66 as shown in FIG. 6, the operation of the motor 46 is suspended. In this state, the leader 34 projecting out from the film delivery ports 28 of the magazine 12 is inserted into the area between the feed roller 80 and the press rollers 82.

The feed roller 80 has already been started to rotate before the leading end portion of the magazine body 14 is fitted into the receiving portion 66, whereby the leader 34 is delivered to the developing machine P. When the leading end portion of the magazine body 14 is thus fitted into the receiving portion 66, the notches 74 formed at the leading end portion of the magazine body 14 are shielded from light by the receiving portion 66. Therefore, the interior of the magazine body 14 is maintained in a light-shielded state, and there is no risk of the films 30 being undesirably exposed when they are pulled out from the respective patrones 24.

As the leader 34 is pulled toward the developing machine P by the driving force of the feed roller 80, the patrones 24 are moved rightwardly within the patrone accommodating portion 22 from the position shown by the solid linein FIG. 6. The patrones 24 thus moved abut against the stopper 68 with an impact which is not sufficiently large for the stopper 68 to move against the biasing force of the tension coil spring 76. The patrones 24 therefore stop when abutting against the stopper 68. In consequence, the portion of each negative film 30 on which images have been recorded and which is accommodated within the patrone 24 is successively pulled out therefrom and is transported into the developing machine P where the film 30 is subjected to a developing process.

When all the exposed portion of the film 30 which is wound in layers on the reel 25 within each patrone 24 has been pulled out, the driving force of the feed roller 80 acts in such a manner that the patrone 24 is pulled toward the film receiving section 52 through the reel 25 by a relatively large force. In consequence, the patrone 24 causes the stopper 68 to pivot clockwise as viewed in FIG. 6 about the pin 70 against the biasing force of the tension coil spring 76.

As a result, the stopper 68 actuates the limit switch 78 so as to energize the solenoid 89 through the controller (not shown). Consequently, the cutter 88 enters the locus of movement of the negative films 30 and cuts the films 30. Thus, the exposed portion of each negative film 30 which has already entered the inside of the developing machine P and the trailing end of the film 30 retained by the reel 25 within the associated patrone 24 are separated from each other.

Figure 7:
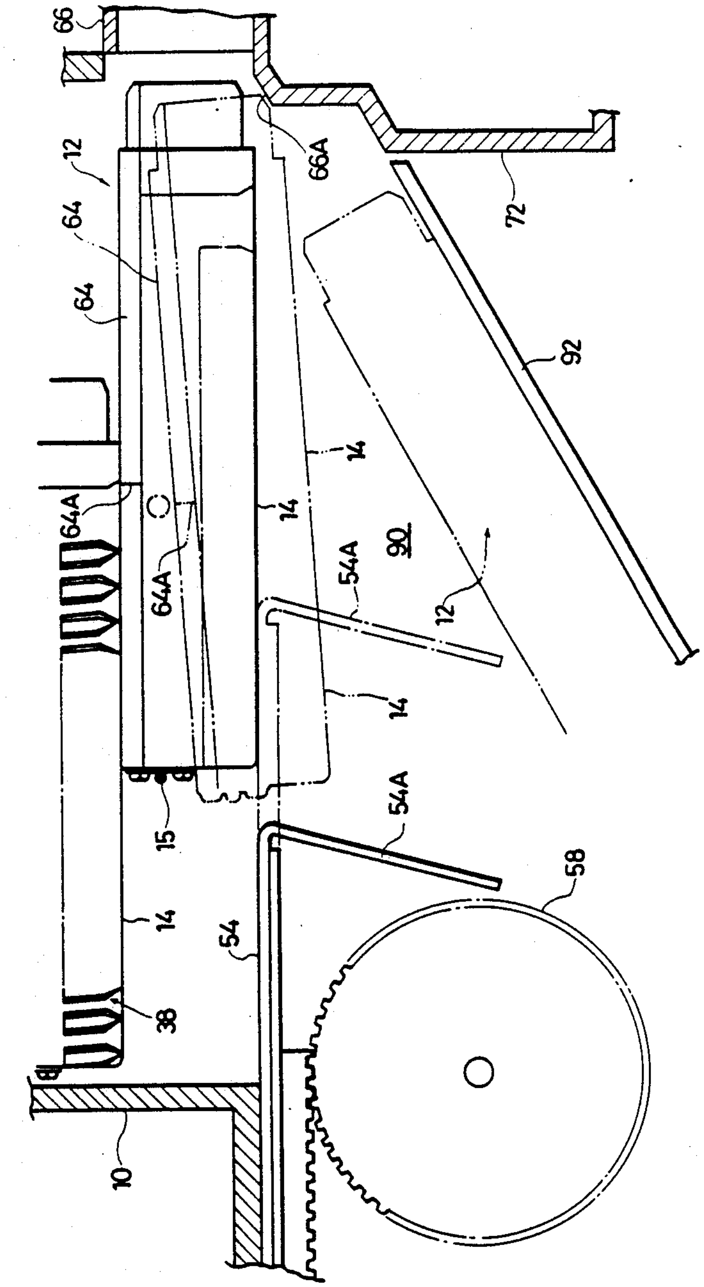
FIG. 7 shows the way in which the magazine is discharged.
Figure 8:
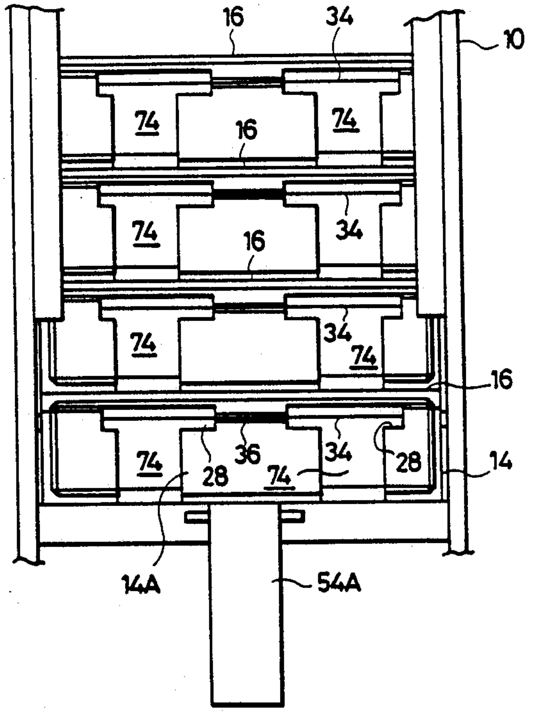
FIG. 8 is a sectional view taken along the line VIII—VIII of FIG. 1.

At this time, the controller reverses the motor 46 so as to move the magazine 12 slightly backward, whereby the leading end portion of the magazine 12 is drawn out from the receiving portion 66, and the magazine 12 is brought into the state shown by the solid line in FIG. 7. At the same time, the motor 60 is started so as to rotate the spur gear 58, whereby the support plate 54 is retracted in the direction in which it separates from the film receiving section 52 until the plate 54 reaches the solid-line position shown in FIG. 7. As a result, the magazine's support is removed, and the magazine 12 consequently falls into the discharge passage 90. Since the lateral projections 64 have already been disposed at a position at which they do not face the retaining pins 62 when the magazine 12 is discharged, there is no possibility of the retaining pins 62 obstructing the fall of the magazine 12.

When the lowermost magazine 12 is dropped onto the chute 92, the subsequent magazine 12 is allowed to drop to the lowermost position in the stand 10, and the above operations are then repeated.

Figure 9:
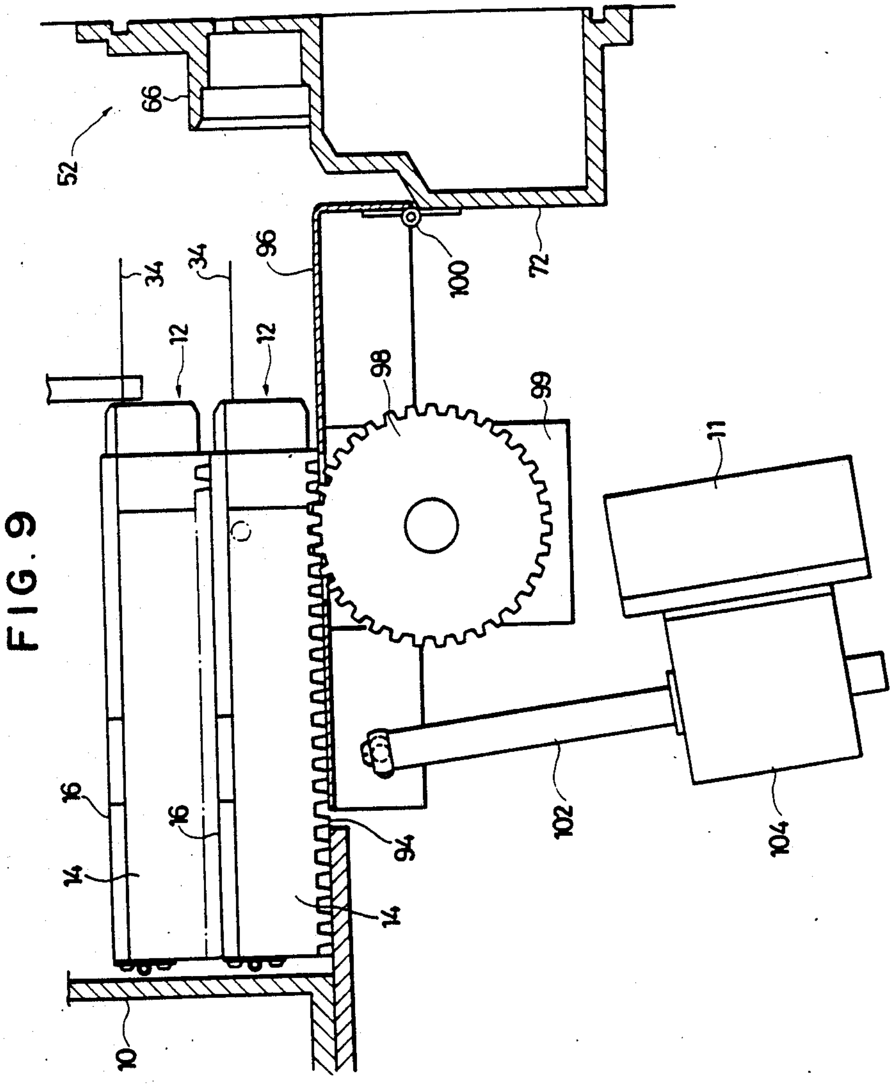
FIG. 9 is a sectional view, corresponding to FIG. 1, which shows a film feeding apparatus to which a second embodiment of the present invention is applied.
Figure 10:
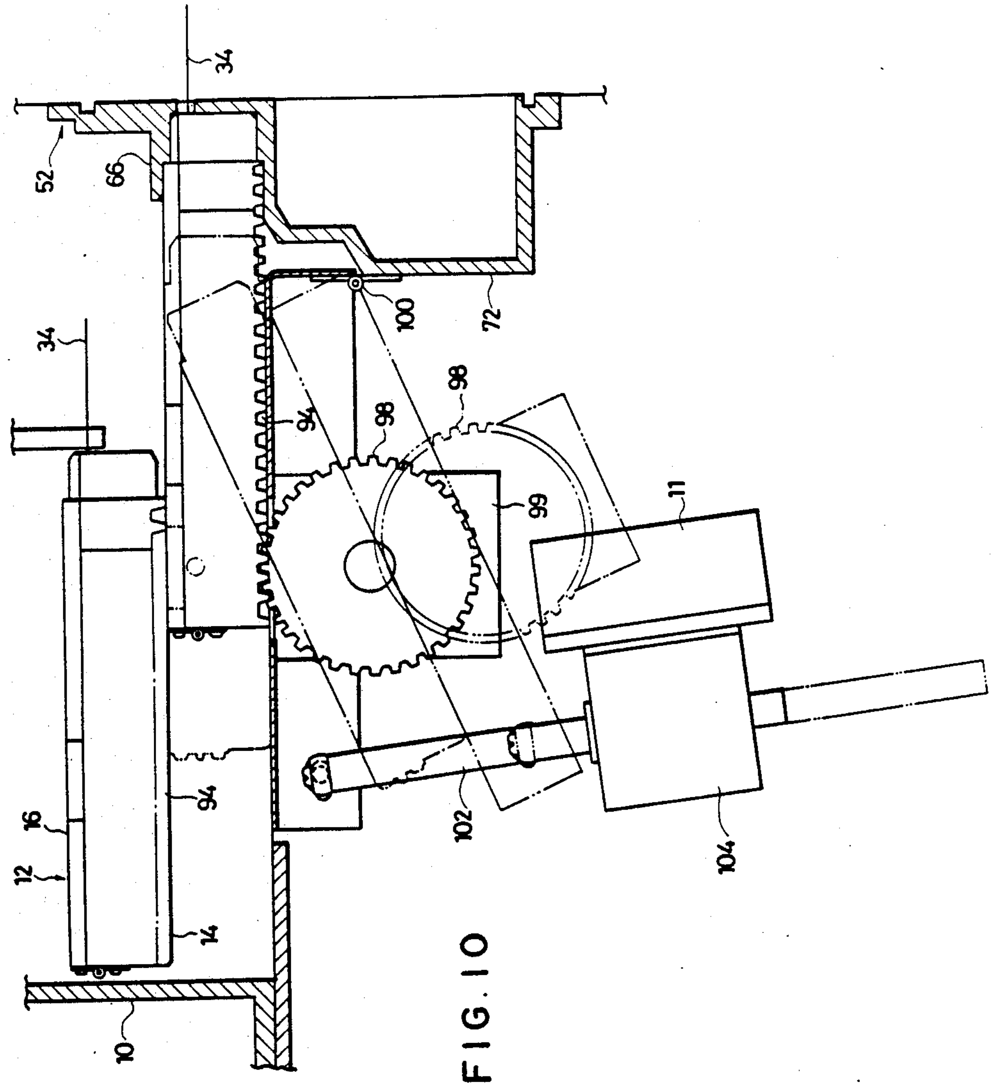
FIG. 10 shows the operation of the apparatus illustrated in FIG. 9.

Referring next to FIGS. 9 and 10, there is shown a film feeding apparatus to which a second embodiment of the present invention is applied.

In this embodiment, a rack 94 is formed on the bottom surface of the magazine body 14 so as to extend longitudinally thereof and is meshed with a spur gear 98 which partially projects from a support plate 96. The spur gear 98 is rotated by driving a motor 99. The support plate 96 is pivotally supported by the frame 72 of the film receiving section 52 through a hinge 100. A driving shaft 102 is pivotally supported at the distal end portion of the support plate 96. The driving shaft 102 can pivot the support plate 96 about the hinge 100 by means of the driving force applied thereto from a solenoid 104 which is secured to the machine frame 11. A motor with a linear motion mechanism, such as a motor with a linear head, may be employed n place of the solenoid 104.

Accordingly, in this embodiment, when the magazine 12 is moved toward the film receiving section 52, the spur gear 98, which is rotated by the motor 99, causes the magazine 12 to move toward the film receiving section 52 through the rack 94 so that the leading end portion of the magazine 12 is fitted into the receiving portion 66, whereby the negative films 30 can be started to be fed out from the respective patrones 24.

When the feed of the negative films 30 has been completed, the motor 99 is reversed to draw out the leading end portion of the magazine 12 from the receiving portion 66. In this state, the solenoid 104 is actuated so as to tilt the support plate 96 as shown in FIG. 10, and the motor 99 is reversed, so that the magazine 10 slides on the support plate 96 to drop therefrom and is then discharged.

Figure 11:
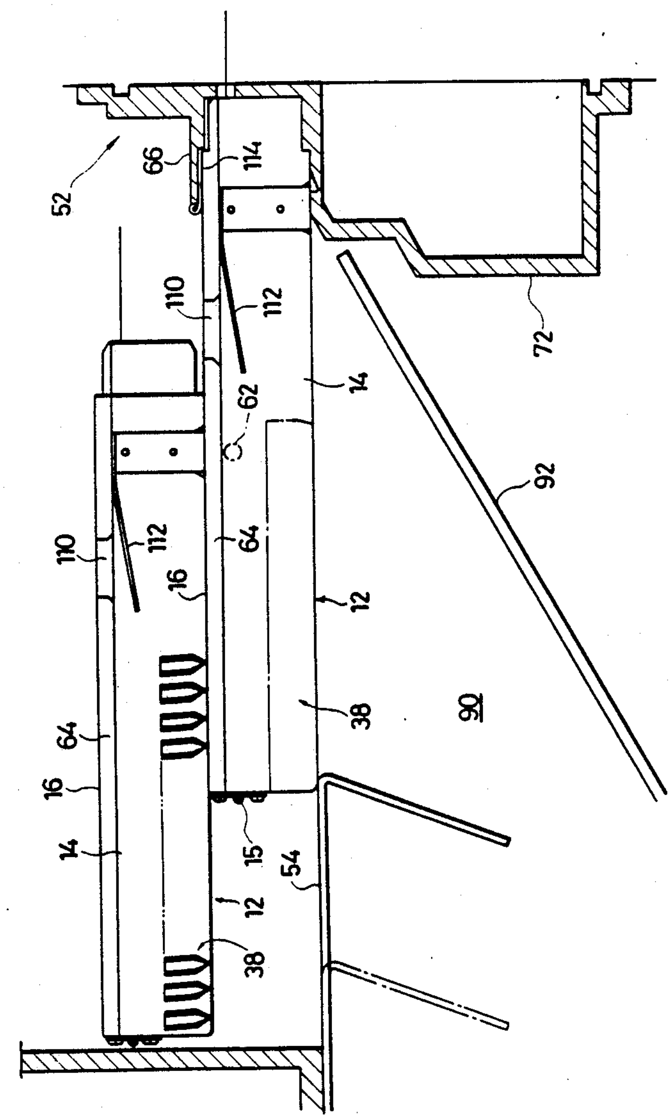
FIG. 11 is a sectional view, corresponding to FIG. 1, which shows a film feeding apparatus to which a third embodiment of the present invention is applied.
Figure 12:
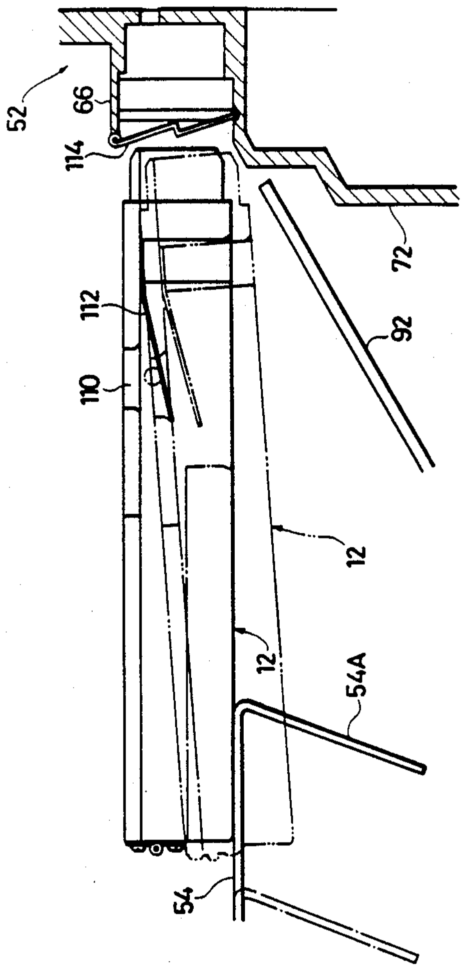
FIG. 12 shows the operation of the apparatus

FIGS. 11 and 12 show in combination a film feeding apparatus to which a third embodiment of the present invention is applied.

In this embodiment, the lateral projections 66 of the magazine 12 are formed so as to extend over the entire longitudinal length of the magazine 12. Notches 110 are formed at the respective intermediate portions of the lateral projections 64. Further, the proximal portion of a leaf spring 112 is retained by a portion of each lateral projection 64 adjacent to and on the side of the notch 110 which is closer to the film receiving section 52. The intermediate portion of the leaf spring 112 is slanted downwardly so as to be positioned below the notch 110 and gradually separated from the notch 110 toward the distal end portion of the leaf spring 112.

Accordingly, in this embodiment, when the lowermost magazine 12 is moved toward the film receiving section 52, the retaining pins 62 cause the respective leaf springs 112 to be elastically deformed, thereby allowing the magazine 12 to move rightward as viewed in FIG. 11. When the magazine 12 is drawn out from the receiving portion 66 and moved backward after the feed of the films 30 has been complated, the retaining pins 62 enter the area on the upper sides of the corresponding leaf springs 112 and face the notches 110, respectively.

Further, in this embodiment, even when the amount by which the magazine 12 projects from the support plate 54 is relatively large, the leading end portion of the magazine 12 is reliably supported and guided so that this leading end portion is prevented from undesirably entering the area within the discharge passage 90.

Additionally, a light-shielding plate 114 is pivotally supported at the leading end receiving portion 66 in this embodiment. When the leading end portion of the magazine 12 has been drawn out from the receiving portion 66, the light-shielding plate 114 closes the opening of the receiving portion 66 by its own weight, thereby preventing light from entering the film receiving section 52. However, when the leading end portion of the magazine 12 is inserted into the receiving portion 66, the light-shielding plate 114 is pushed up by this leading end portion, thereby opening the receiving portion 66.

It is to be noted that the magazine discharging structure exemplified in the above embodiments is not necessarily limitative, and other arrangements, such as one in which the lowermost magazine 12 is discharged by drawing it out leftwardly as viewed in FIG. 1, may be employed in the present invention. Further, if the whole of the stand 10 for loading magazines 12 is maintained in a light-shielded condition, it is possible to eliminate the need for any light-shielding structure required when the lowermost magazine 12 and the film receiving portion 52 are connected together.

As has been described above, the present invention provides a film feeding apparatus for drawing out a negative film from the patrone and feeding this film to a developing machine, which includes means for accommodating a multiplicity of magazines piled one upon another, each magazine accommodating a patrone; magazine driving means for moving the lowermost magazine among those accommodated within the accommodating means to a film receiving section of the developing machine and causing the film within the magazine to be clamped by a feed roller located within the film receiving section; and discharge means for retracting the magazine from the film receiving section so as to be discharged after the film has been completely fed from the magazine to the developing machine. It is therefore possible to accommodate a plurality of negative films in the magazines and feed the films to the developing machine successively.

What is claimed is:

1. A magazine employed when a film accommodated within a film cartridge is fed to a developing machine by using a film feeding apparatus, said magazine comprising:

(a) a magazine body for at least partially enclosing said cartridge;

(b) a cover which covers the interior of said magazine body, said interior being exposed when said cover is raised; and (c) a film delivery port formed in a part of said magazine body, said magazine body having a space extending toward said port along a direction in which said film in drawable from said cartridge whereby said cartridge is movable within said space, while said cover is closed, from a position away from said silm delivery port to a position close to said port.

2. A magazine according to claim 1, wherein said film delivery port is formed by a closing of said cover.

3. A magazine according to claim 1, wherein said magazine body is provided with guide means for guiding said cartridge in the directions in which said cartridge moves toward and away from said film delivery port while said cover is closed.

4. A magazine according to claim 3, wherein said magazine body has two of said spaces extending toward said port along said direction in which said film is drawable for receiving respective film cartridges and wherein said guide means is a rib provided on said magazine body between said two spaces.

5. A magazine according to claim 1, wherein said magazine body is provided in the vicinity of said film delivery port with an opening which can receive means for detecting a movement of said cartridge.

6. A magazine and transport system according to claim 1, wherein said magazine body is provided with a rack, said magazine and transport system further comprising means for transporting said magazine and having a rotary part engageable with said rack.

7. A magazine and film delivery system as recited in claim 1, further comprising:

means for drawing said film from said film cartridge through said film delivery port; and means for detecting a movement of said cartridge caused by said drawing means thereby allowing detection of a state wherein said film within said cartridge has been entirely drawn out by said drawing means, said detecting means being at least partially insertable into said magazine body through an opening therethrough in a vicinity of said film delivery port.

* * * * *